Patented Dec. 2, 1941

2,264,359

UNITED STATES PATENT OFFICE 2,264,359

POLYMERIZED ETHER OF CASHEW NUT SHELL LIQUID AND METHOD THEREFOR

Solomon Caplan, New York, N. Y., assignor to The Harvel Corporation, a corporation of New Jersey No Drawing. Application August 24, 1939, Serial No. 291,706

2 Claims. (Cl. 260—46)

The present invention relates to methods and steps of transforming cashew nut shell liquid by the substitution of hydrocarbon radicle for the hydrogen of the phenolic hyroxyl groups characteristic of the constituents of cashew nut shell liquid, which are principally cardol and anacardic acid, and the present invention relates also to the ethers which are the transformation products of the methods of the present invention and to cashew nut shell liquid in which a substantial part or all of said hydrogen is replaced by a hydrocarbon radicle.

The primary hydrocarbon ethers are the most stable under heat; the secondary hydrocarbon ethers are next in stability; and the tertiary hydrocarbon ethers are least stable, and even unstable, changing to the corresponding substituted phenols.

An object of the present invention is to provide hydrocarbon ethers of phenols, which ethers have a degree of stability when subjected to heat.

Cashew nut shell liquid is composed substantially entirely of a mixture of cardol and anacardic acid each of which compounds has a long chain unsaturated hydrocarbon substituent on the nucleus and a hydroxyl group on the nucleus, and it is an object of the present invention to substitute a hyrocarbon radicle for the hydrogen of said hydroxyl groups, either to completion or to a substantial degree.

Either raw cashew nut shell liquid or cashew nut shell liquid which has been somewhat modified is suitable for the practice of the present invention to make products for various uses. For example, cashew nut shell liquid which has been treated by the method of Patent 2,067,919 to Harvey and Damitz and which is in the liquid state can be modified to make ethers according to the present invention by substantially the same steps as used for making ethers of raw cashew nut shell liquid. According to said Patent 2,067,919 cashew nut shell liquid is treated with material such as sulphuric acid to throw out naturally occurring metals as salts which can be separated from the treated cashew nut shell liquid, also this patent describes the further use of the sulphuric acid to polymerize the cashew nut shell liquid to various stages and states among which are liquids which are suitable for the practice of the present invention.

An example of the practice of the method of the present invention together with the product thereof is as follows:

Three thousand pounds of cashew nut shell liquid and about 1060 pounds of primary amyl chloride are placed in a tank having a steam jacket; a circulating pipe line loop from the bottom thereof, through a pump and then back to the upper part of said tank; and a pressure tight cover. About four hundred and fifty pounds of sodium hydroxide are dissolved in about two hundred and sixty gallons of water and the solution added to the ingredients in the tank.

The cover is then closed and tightened and the materials in the tank, by means of said pump, are looped through said pipe line for thorough mixing. By means of said steam jacket, the temperature is brought up to about 325° F. and maintained there for about seven hours, the pressure in the tank accordingly being at 100 to 110 lbs. At the end of this time the steam is cut off the water jacket, the pump is stopped and the tank is left to cool over night at which time the temperature has dropped to about 250° F. to 275° and the pressure to about 40 lbs. and the water solution of sodium chloride and any unreacted sodium hydroxide has settled to the bottom of the tank. The pressure is relieved and the salt solution drawn off, after which the cashew nut shell liquid-amyl ether reaction product is tested and neutralized for any alkalinity or acidity. A satisfactory condition for many purposes is slightly acid to methyl orange or phenol red. The cashew-amyl ether can then be heated to about 260° F. to drive off any water therein.

In like manner the ethyl ether of cashew nut shell liquid can be made by using ethyl chloride instead of the amyl chloride, the amount of ethyl chloride used being molecularly proportional to the amount of amyl chloride used in the previous example. Likewise benzyl chloride and naphthyl chloride can be used for making the corresponding ethers.

Monohydrocarbon and dihydrocarbon sulphate can also be used, in the presence of alkali, to produce hydrocarbon ethers of cashew nut shell liquid. Either dry, powdered alkali or solution, as in water, can be used. However when the alkali solution is used heating in a closed container is desirable in order to obtain the pressure and thereby the temperature needed to produce complete reaction of the dihydrocarbon sulphate with the cashew nut shell liquid, one of the hydrocarbon radicles being found to react at or below the boiling point of water under the conditions of the reaction and the other hydrocarbon radicle reaction above the boiling point of water. Monoethyl sulphate, diethyl sulphate, primary monopropyl sulphate and primary diethyl sulphate are illustrative examples of the hydrocarbon reagents suitable for use in making hydrocarbon ethers of cashew nut shell liquid, with the aid of an alkali such as sodium hydroxide, optassium hydroxide, calcium hydroxide, and so on. These reagents are used in amounts to give molecular ratios of the hydbrocarbon radicle to cashew nut shell liquid, the molecular weight of the latter being taken as about 288.

The products of the present invention are suitable for various purposes among which is the distillation thereof to obtain the hydrocarbon ethers of the anacardic acid constituent of cashew nut shell liquid, which are described in my copending application Ser. No. 733,986, filed July 6, 1934, and to obtain ether residues. The present method has some advantages, for example the ethyl ethers of cashew nut shell liquid gives a higher yield of the ethers of the anacardic acid constituent by steam distillation than does the method of said copending application and the yield can be as high as 75% or more. The distillation of the hydrocarbon ethers of cashew nut shell liquid of the present invention can be carried on under vacuum or at atmospheric pressure and can be carried on with steam. At about 250° to 300° C. the distillation with steam is destructive and the products are the hydrocarbon ethers of cardanol such as described in said copending application.

In the claims the term ethers of the anacardic acid constituent of cashew nut shell liquid is considered to be generic to ethers of anacardic acid and to ethers of cardol.

Having thus described my invention, what I claim and desire to protect by Letters Patent is:

1. The method which comprises substituting an alkyl group for the hydrogen of the hydroxyl group of polymerized cashew nut shell liquid.

2. A hydrocarbon ether of a polymer of cashew nut shell liquid.

SOLOMON CAPLAN.